US012718099B2

(12) United States Patent
Kim

(10) Patent No.: US 12,718,099 B2
(45) Date of Patent: Aug. 25, 2026

(54) METHOD FOR SELF-SUPERVISED REPRESENTATION LEARNING FOR VISION-BASED REINFORCEMENT LEARNING ROBUST TO VISUAL DISTRACTION, DATA INFERENCE APPARATUS USING SELF-SUPERVISED LEARNING MODEL, AND STORAGE MEDIUM STORING INSTRUCTIONS TO PERFORM METHOD FOR SELF-SUPERVISED REPRESENTATION LEARNING

(71) Applicant: Research & Business Foundation SUNGKYUNKWAN UNIVERSITY, Suwon-si (KR)

(72) Inventor: Yusung Kim, Suwon-si (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 192 days.

(21) Appl. No.: 18/439,294

(22) Filed: Feb. 12, 2024

(65) Prior Publication Data

US 2024/0273792 A1 Aug. 15, 2024

(30) Foreign Application Priority Data

Feb. 13, 2023 (KR) ........................ 10-2023-0018931

(51) Int. Cl.
*G09G 5/00* (2006.01)
*G06T 11/60* (2006.01)

(52) U.S. Cl.
CPC .................................... *G06T 11/60* (2013.01)

(58) Field of Classification Search
CPC ......... G06T 11/60; G06T 11/40; G06T 19/00; G06T 11/00; G06T 11/20; G06T 11/206; G06T 7/0012; G06T 2207/10081; G06T 2207/30004; G06T 11/203; G06T 2211/441; G06T 2210/28; G06T 11/001; G06T 2200/12; G06F 9/4443; G06F 3/0481; G06F 30/13; G06F 3/04845; G06F 3/04883; G06F 40/143; G06F 16/54; G06F 16/56; G06F 16/5838; G06F 16/58; G06F 16/55; G06F 40/40; G06V 20/20; G06V 10/7753; G11B 27/10; H04N 21/47217; G16H 30/20; G06N 20/20; G06N 3/045; G06N 3/047; G06N 3/08; G06Q 30/0643
USPC .......................................................... 345/619
See application file for complete search history.

(56) References Cited

U.S. PATENT DOCUMENTS

2019/0258953 A1* 8/2019 Lang ...................... G06N 3/045
2020/0349447 A1* 11/2020 Zhong .................... G06N 3/084

(Continued)

*Primary Examiner* — Gordon G Liu

(57) ABSTRACT

There is provided a self-supervised representation learning training method. The method comprises receiving an image to generate a first augmented image and a second augmented image using at least one augmentation algorithm; inputting the first augmented image and the second augmented image to the generator to output a first latent state from the first augmented image and output a second latent state from the second augmented image; and training the generator and the discriminator to minimize at least one cost function with respect to the first latent state and the second latent state.

17 Claims, 7 Drawing Sheets

(56) References Cited

U.S. PATENT DOCUMENTS

2022/0301296 A1* 9/2022 Babagholami Mohamadabadi .... G06V 10/776
2023/0036068 A1* 2/2023 Gurevich .............. G16H 50/30

* cited by examiner

METHOD FOR SELF-SUPERVISED REPRESENTATION LEARNING FOR VISION-BASED REINFORCEMENT LEARNING ROBUST TO VISUAL DISTRACTION, DATA INFERENCE APPARATUS USING SELF-SUPERVISED LEARNING MODEL, AND STORAGE MEDIUM STORING INSTRUCTIONS TO PERFORM METHOD FOR SELF-SUPERVISED REPRESENTATION LEARNING

CROSS REFERENCE TO RELATED APPLICATIONS

This application claims the benefit under 35 USC § 119 (a) of Korean Patent Application No. 10-2023-0018931, filed on Feb. 13, 2023, the entire disclosure of which is incorporated herein by reference for all purpose.

TECHNICAL FIELD

The present disclosure relates to a self-supervised representation learning method for vision-based reinforcement learning robust to visual distractions and a self-supervised representation learning device for performing the method.

This work was supported by Institute of Information & communications Technology Planning & Evaluation (IITP) grant funded by Korea government (MSIT; Ministry of Science and ICT) (No. 2022-0-01045, Development of Open-Domain Multimodal Self-Directed Artificial Intelligence Technology).

BACKGROUND ART

Vision-based reinforcement learning has been studied to train optimal control using input high-dimensional images.

As attempts to apply reinforcement learning to real-world applications such as robotics and autonomous driving that mainly use images increase, the demand for vision-based reinforcement learning continues to increase.

However, when visual distractions unrelated to the task (such as clouds, shadows, light, etc.) are included in the image, the visual distractions hinder the optimal control learning of conventional vision-based reinforcement learning.

In addition, since the visual distractions are not considered in training vision-based reinforcement learning model, inferring performance of the vision-based reinforcement learning model is significantly deteriorated in actual tests in which the visual distractions vary depending on time and space.

Therefore, there is a need for a method for training the vision-based reinforcement learning model to perform optimal control even when unexperienced visual distractions appear.

SUMMARY

Embodiments of the present disclosure provide a self-supervised representation training method for receiving an image to generate a first augmented image and a second augmented image using at least one augmentation algorithm; inputting the first augmented image and the second augmented image to the generator to output a first latent state from the first augmented image and output a second latent state from the second augmented image; and training the generator and the discriminator to minimize at least one cost function with respect to the first latent state and the second latent state.

The aspects of the present disclosure are not limited to the foregoing, and other aspects not mentioned herein will be clearly understood by those skilled in the art from the following description.

In accordance with an aspect of the present disclosure, there is provided a self-supervised representation training method for performing self-supervised representation training for vision-based reinforcement training robust to visual distractions using a self-supervised representation training program including a generator and a discriminator, the method comprises: receiving an image to generate a first augmented image and a second augmented image using at least one augmentation algorithm; inputting the first augmented image and the second augmented image to the generator to output a first latent state from the first augmented image and output a second latent state from the second augmented image; and training the generator and the discriminator to minimize at least one cost function with respect to the first latent state and the second latent state.

Herein, the augmentation algorithm may include a spatial augmentation algorithm and a pixel-level augmentation algorithm, and wherein the generating the first augmented image and the second augmented image may include generating the first augmented image using the spatial augmentation algorithm; and generating the second augmented image using the spatial augmentation algorithm and the pixel-level augmentation algorithm.

Additionally, the training the generator and the discriminator may include inputting the first latent state and the second latent state to a reinforcement training model; and determining a third latent state corresponding to a next state of the first latent state and a fourth latent state corresponding to a next state of the second latent state using an action of an agent determined according to a control policy of the reinforcement learning model.

Herein, the reinforcement learning model may be trained to determine a control policy for maximizing cumulative reward.

Additionally, the self-supervised representation training program further may include an inverse dynamics module, and the self-supervised representation training method further comprises inferring a first action from the first latent state and the fourth latent state using the inverse dynamics module; and inferring a second action from the second latent state and the third latent state using the inverse dynamics module.

Herein, wherein the inverse dynamics module may be trained to receive a training latent state and a next state of the training latent state and output an action of the agent according to the training latent state.

Additionally, the self-supervised representation training program may further include a forward dynamics module, the self-supervised representation training method further comprises: inferring a fifth latent state from the second latent state and the first action using the forward dynamics module; and inferring a sixth latent state from the first latent state and the second action using the forward dynamics module.

Herein, the forward dynamics module may be trained to receive a learning latent state and an action of the agent according to the learning latent state and output a next state of the learning latent state.

Additionally, the method may include training the generator and the discriminator to minimize at least one cost function determined using the inverse dynamics module and the forward dynamics module with respect to the fifth latent state and the sixth latent state.

In accordance with another aspect of the present disclosure, there is provided a non-transitory computer readable storage medium storing computer executable instructions, wherein the instructions, when executed by a processor, cause the processor to perform a self-supervised representation training method for performing self-supervised representation training for vision-based reinforcement training robust to visual distractions using a self-supervised representation training program including a generator and a discriminator, the method comprises receiving an image to generate a first augmented image and a second augmented image using at least one augmentation algorithm; inputting the first augmented image and the second augmented image to the generator to output a first latent state from the first augmented image and output a second latent state from the second augmented image; and training the generator and the discriminator to minimize at least one cost function with respect to the first latent state and the second latent state determined using the discriminator.

In accordance with another aspect of the present disclosure, there is provided a computer program including computer executable instructions stored in a non-transitory computer readable storage medium, wherein the instructions, when executed by a processor, cause the processor to perform a self-supervised representation training method for performing self-supervised representation training for vision-based reinforcement training robust to visual distractions using a self-supervised representation training program including a generator and a discriminator, the method comprises receiving an image to generate a first augmented image and a second augmented image using at least one augmentation algorithm; inputting the first augmented image and the second augmented image to the generator to output a first latent state from the first augmented image and output a second latent state from the second augmented image; and training the generator and the discriminator to minimize at least one cost function with respect to the first latent state and the second latent state.

In accordance with another aspect of the present disclosure, there is provided a device for inferring data using a self-supervised training model, the device comprises a memory configured to store one or more instructions; and a processor configured to execute the one or more instructions stored in the memory, wherein the instructions, when executed by the processor, cause the processor to check input data, input the input data to the self-supervised training model, and check results inferred by the self-supervised training model, wherein the self-supervised learning model is trained by a self-supervised representation training method comprising: receiving an training image and generating a first augmented image and a second augmented image using at least one augmentation algorithm; inputting the first augmented image and the second augmented image to a generator to output a first latent state from the first augmented image and output a second latent state from the second augmented image; and training the generator and the discriminator to minimize at least one cost function with respect to the first latent state and the second latent state.

In accordance with another aspect of the present disclosure, there is provided a computer program including computer executable instructions stored in a non-transitory computer readable storage medium, wherein the instructions, when executed by a processor, cause the processor to perform a self-supervised representation training method for performing self-supervised representation training for vision-based reinforcement training robust to visual distractions using a self-supervised representation training program including a generator and a discriminator, the method comprises receiving an image to generate a first augmented image and a second augmented image using at least one augmentation algorithm; inputting the first augmented image and the second augmented image to the generator to output a first latent state from the first augmented image and output a second latent state from the second augmented image; and training the generator to minimize at least one cost function with respect to the first latent state and the second latent state determined using the discriminator.

In accordance with another aspect of the present disclosure, there is provided a device for inferring data using a self-supervised training model, the device comprises a memory configured to store one or more instructions; and a processor configured to execute the one or more instructions stored in the memory, wherein the instructions, when executed by the processor, cause the processor to check input data, input the input data to the self-supervised training model, and check results inferred by the self-supervised training model, wherein the self-supervised learning model is trained by a self-supervised representation training method comprising: receiving an training image and generating a first augmented image and a second augmented image using at least one augmentation algorithm; inputting the first augmented image and the second augmented image to a generator to output a first latent state from the first augmented image and output a second latent state from the second augmented image; and training the generator to minimize at least one cost function with respect to the first latent state and the second latent state determined using a discriminator.

According to an embodiment of the present disclosure, it is possible to achieve the effect of extracting features of at least one object associated with a predetermined task in a specific environment even if visual obstructions are present.

In addition, according to an embodiment of the present disclosure, it is possible to achieve the effect of improving the performance of a reinforcement learning model on the basis of self-supervised representation learning through which features essential for control in a specific environment are extracted even if visual obstructions are present.

BEST MODE FOR CARRYING OUT THE INVENTION

Figure 1:
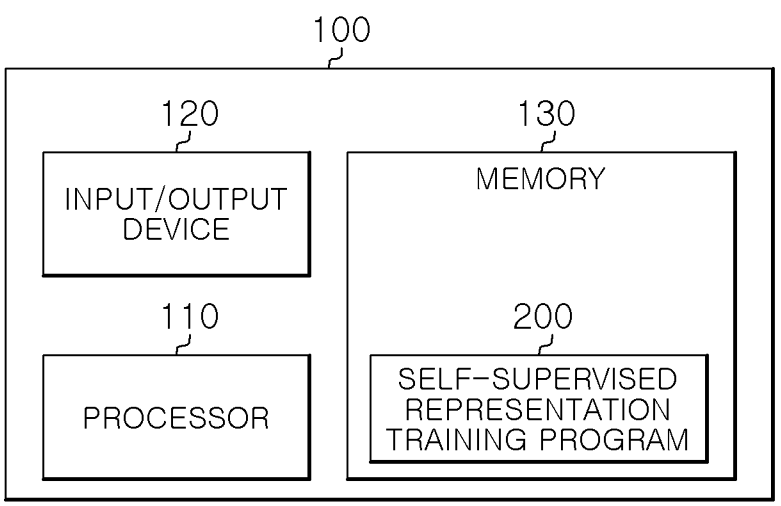
FIG. 1 is a block diagram showing a self-supervised representation learning device according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 is a block diagram showing a self-supervised representation learning device according to an embodiment of the present disclosure.

Referring to FIG. 1, the self-supervised representation learning device 100 may include a processor 110, an input/output device 120, and a memory 130.

The processor 110 may generally control the operation of the self-supervised representation learning device 100.

The processor 110 can receive an image using the input/output device 120.

In the present disclosure, an image may include at least one object associated with a predetermined task and may mean an image acquired in a specific environment (for example, an autonomous driving environment or a robotics work environment) for performing the task.

In addition, the processor 110 may receive an action of an agent determined according to a reinforcement learning model control policy in the specific environment and current state and the next state according to the action of the agent using the input/output device 120.

Here, an environment can provide an agent with a state on which an agent can base his actions. The agent can then determine an action on the basis of the state obtained from the environment. When the agent transfers the determined action to the environment, the agent can receive a reward and next state based on the action from the environment.

Specifically, when the current state and the next state are represented to be related to time t, the agent determines a random action $\alpha_t$ according to the probability distribution of possible actions on the basis of a state $s_t$ obtained from an environment at any time t and receive the next state $s_{t+1}$ and a reward $r_t$ from the environment. Based on such an interaction, the agent can learn a policy that maximizes cumulative reward in a given environment. The policy may refer to a set of probabilities for an agent to take a specific action in a specific state.

Additionally, the agent may determine an action on the basis of at least one of a value-based action determination method, a policy-based action determination method, and an action determination method based on both a value and a policy.

Specifically, the value-based action determination method is a method of determining an action of an agent that gives the highest value in each state on the basis of a value function. For example, algorithms that adopt the value-based action determination method may include Q-learning, DQN, etc.

Additionally, the policy-based action determination method is a method of determining an action of an agent on the basis of reward and policy functions without a value function. For example, algorithms that adopt the policy-based action determination method may include the policy gradient algorithm, etc.

In addition, the action determination method based on both a value and a policy is a method of determining an action of an agent by performing learning in a way that once an action is determined through a policy function, the action is evaluated based on a value function. For example, algorithms that adopt the action determination method based on both a value and a policy may include the actor-critic algorithm, etc.

Although the image, the agent's action, and the next state according to the agent's action are input through the input/output device 120 in the present disclosure, the present disclosure is not limited thereto. That is, according to an embodiment, the self-supervised representation learning device 100 may include a transceiver (not shown), and the self-supervised representation learning device 100 may use the transceiver (not shown) to determine at least one of the image, the agent's action, and the next state according to the agent's action may be received, and at least one of the image, the agent's action, and the next state according to the agent's action may be generated within the self-supervised representation learning device 100.

The processor 110 may receive an image, generate a first augmented image and a second augmented image using at least one augmentation technique, input the first augmented image and the second augmented image to a generator to output a first latent state from the first augmented image and output a second latent state from the second augmented image, and train the generator to minimize at least one cost function with respect to the first latent state and the second latent state determined using a discriminator.

The input/output device 120 may include one or more input devices and/or one or more output devices. For example, input devices may include a microphone, a keyboard, a mouse, a touchscreen, and the like, and output devices may include a display, a speaker, and the like.

The memory 130 may store a self-supervised representation learning program 200 and information necessary to execute the self-supervised representation learning program 200.

In this specification, the self-supervised representation learning program 200 may refer to software that includes a generator and a discriminator and contains instructions for training the generator to minimize at least one cost function with respect to a plurality of latent states determined by receiving an image and using the discriminator.

In order to execute the self-supervised representation learning program 200, the processor 110 may load the self-supervised representation learning program 200 and information necessary to execute the self-supervised representation learning program 200 from the memory 130.

A generator training process according to an embodiment of the present disclosure will be described later.

The functions and/or operations of the self-supervised representation learning program 200 will be described in detail with reference to FIG. 2.

Figure 2:
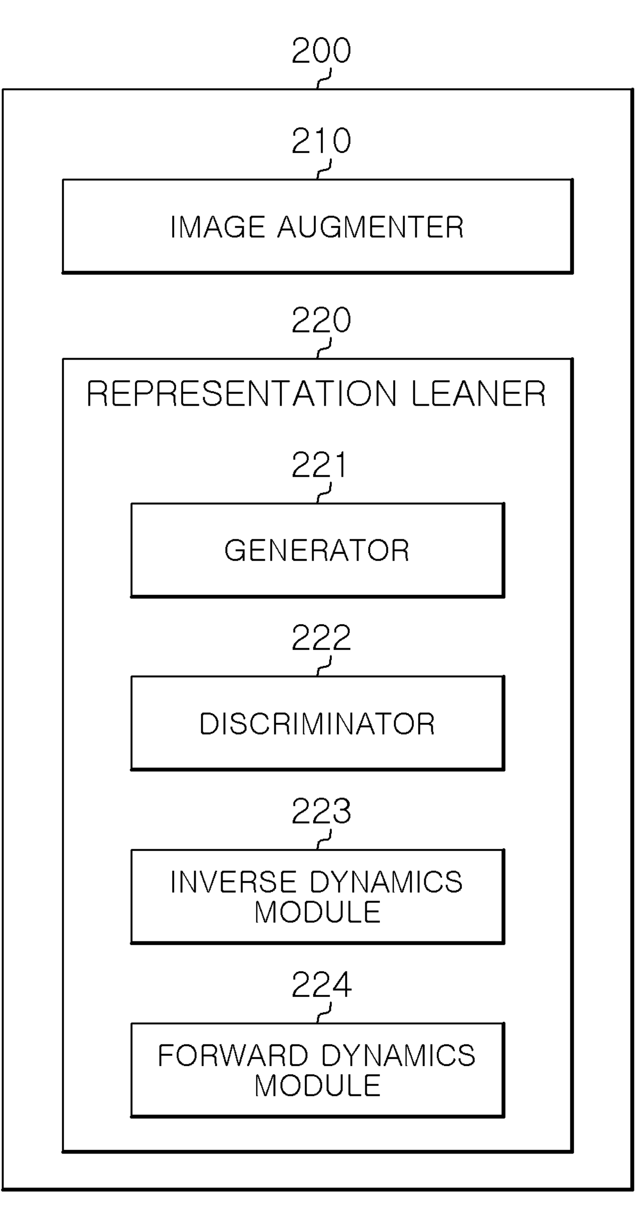
FIG. 2 is a block diagram conceptually showing functions of a self-supervised representation learning program according to an embodiment of the present disclosure.

FIG. 2 is a block diagram conceptually showing the functions of the self-supervised representation learning program according to an embodiment of the present disclosure.

Referring to FIG. 2, the self-supervised representation learning program 200 may include an image augmenter 210 and a representation learner 220, and the representation learner may include a generator 221, a discriminator 222, and an inverse dynamics module 223, and a forward dynamics module 224.

The image augmenter 210 and the representation learner 220 shown in FIG. 2 are conceptually divided parts of the functions of the self-supervised representation learning program 200 in order to easily describe the functions of the self-supervised representation learning program 200, and the present disclosure is not limited to thereto. According to an embodiment, the functions of the image augmenter 210 and the representation learner 220 may be merged/separated and may be implemented as a series of instructions included in one program.

First, the image augmenter 210 may receive an image and generate a first augmented image and a second augmented image using at least one augmentation technique.

Here, the augmentation technique may include a spatial augmentation technique and a pixel-level augmentation technique.

The spatial augmentation technique may refer to a technique of generating an augmented image using left-right inversion, up-down inversion, rotation, enlargement, reduction, cropping, and the like of the image.

For example, spatial augmentation techniques may include a random-shift technique.

The random shift technique may refer to a technique through which at least a part of each side of an image is randomly selected and cropped, and then the cropped image is returned to the size of the original image.

Additionally, the pixel-level augmentation technique may refer to a technique of generating an augmented image by changing the brightness, saturation, contrast, brightness, noise, and the like of the image.

For example, pixel-level augmentation technique may include a gray scale technique, a random convolution technique, a color-jitter technique, and a cutout-color technique.

The gray scale technique refers to a technique for converting an RGB image into a gray-scale image according to a certain probability, the random convolution technique refers to a technique for converting an image through a randomly initialized convolution layer, the color-jitter technique refers to a technique for converting an RGB image into an HSV image and adding noise to each channel of HSV, and the cutout-color technique refers to a technique for inserting a shade of a random color into an image.

Specifically, the first augmented image may be an image created through a low-level change of the image, and the second augmented image may be an image created through a high-level change of the image.

More specifically, the image augmenter 210 may generate the first augmented image using the spatial augmentation technique.

Additionally, the image augmenter 210 may generate the second augmented image using the spatial augmentation technique and the pixel-level augmentation technique.

For example, the first augmented image may be generated using the random shift technique. Additionally, the second augmented image may be generated using at least one of the gray scale technique, random convolution technique, color-jitter technique, and cutout-color technique together with the random shift technique.

Next, the representation learner 220 inputs the first augmented image and the second augmented image to the generator 221 to output a first latent state from the first augmented image and output a second latent state from the second augmented image.

Here, the generator 221 may refer to an encoder that receives an image and outputs features of at least one object related to a predetermined task as a latent state (or latent vector).

For example, upon receiving an image acquired in an autonomous driving environment, the generator 221 may output features of objects on a road that affect a movement route of a vehicle during autonomous driving as a latent state (or latent vector).

More specifically, upon receiving a first augmented image created through a low-level change of an original image obtained in an autonomous driving environment and a second augmented image created through a high-level change of the original image, the generator 221 may output features of objects on a road that affect a movement route of a vehicle during autonomous driving in an environment in which the original image is slightly distorted and an environment in which the image is significantly distorted as a first latent state and a second latent state.

However, the environment for performing a predetermined task according to an embodiment of the present disclosure is merely an example and may be changed in various ways within the scope of achieving the purpose of the present disclosure.

Next, the representation learner 220 may train the generator to minimize at least one cost function with respect to the first and second latent states determined using the discriminator 222.

Here, the representation learner 220 may train the generator 221 to equally output the first latent state and the second latent state output from the first augmented image and the second augmented image.

Additionally, the representation learner 220 may train the discriminator 222 to minimize the difference between the first latent state and the second latent state.

Specifically, the cost function (or objective function) J(Ø) for the generator 221 is a function for performing optimization such that a second latent state value (e.g., a value determined by passing the second latent state through a classifier) is relatively greater than a first latent state value (e.g., a value determined by passing the first latent state through the classifier), and can be represented as the following mathematical expression 1.

$$j(\phi) = -\log(\sigma(D(z^s) - D(z^w)) \quad \text{[Mathematical expression 1]}$$

Here, Ø represents the generator 221, D represents the discriminator 222, $z^w$ represents the first latent state, $z^s$ represents the second latent state, and σ represents an activation function and may mean a sigmoid function.

The cost function (or objective function) J(D) for the discriminator 222 is a function that performs optimization such that the first latent state value is relatively greater than the second latent state value, and can be represented as the following mathematical expression 2.

$$J(D) = -\log(\sigma(D(z^w) - D(z^s)) \quad \text{[Mathematical expression 2]}$$

Here, D represents the discriminator 222, $z^w$ represents the first latent state, $z^s$ represents the second latent state, and σ represents an activation function and may mean a sigmoid function.

More specifically, the representation learner 220 may alternately train the generator 221 and the discriminator 222 to minimize the cost function for the generator 221 and the cost function for the discriminator 222 through backpropagation.

Accordingly, the generator 221 can equally output the first latent state and the second latent state from the first augmented image and the second augmented image.

That is, regardless of whether the original image is slightly or significantly distorted, the generator 221 can achieve the effect of outputting features of at least one object related to a predetermined task in a specific environment.

Meanwhile, the representation learner 220 may further train the generator 221 using a reinforcement learning model (not shown), the inverse dynamics module 223, and the forward dynamics module 224.

Here, the inverse dynamics module may be trained to receive a latent state and the next state of the latent state and output an action of an agent according to the latent state.

Additionally, the forward dynamics module may be trained to receive a latent state and an action of an agent according to the latent state and output the next state of the latent state.

For example, the representation learner 220 may input the first latent state and the second latent state to a reinforcement learning model.

In addition, the representation learner 220 may determine a third latent state corresponding to the next state of the first latent state and a fourth latent state corresponding to the next state of the second latent state using an action of the agent determined according to the control policy of the reinforcement learning model.

Specifically, the third latent state may mean a latent state at time t+1 determined using the agent's action from a latent state at time t determined in an environment in which the original image is slightly distorted.

Additionally, the fourth latent state may mean a latent state at time t+1 determined using the agent's action from a latent state at time t determined in an environment in which the original image is significantly distorted.

Meanwhile, the representation learner 220 may infer a first action from the first latent state and the fourth latent state using the inverse dynamics module 223. Additionally, the representation learner 220 may infer a second action from the second latent state and the third latent state using the inverse dynamics module 223.

Specifically, the first action may be inferred using the latent state at time t determined in an environment in which the original image is slightly distorted and the latent state at time t+1 determined in an environment in which the original image is significantly distorted.

Additionally, the second action may be inferred using the latent state at time t determined in an environment in which the original image is significantly distorted and the latent state at time t+1 determined in an environment in which the original image is slightly distorted.

Meanwhile, the representation learner 220 may infer a fifth latent state from the second latent state and the first action using the forward dynamics module 224. Additionally, the representation learner 220 may infer a sixth latent state from the first latent state and the second action using the forward dynamics module 224.

Specifically, the fifth latent state may be inferred from an action inferred in order to determine a latent state at time t+1 determined in an environment in which the original image is significantly distorted from the latent state at time t determined in an environment in which the original image is significantly distorted and the latent state at time t determined in an environment in which the original image is slightly distorted.

That is, the fifth latent state corresponds to the next state of the second latent state, but may be inferred in consideration of not only an environment in which the original image is significantly distorted but also an environment in which the original image is slightly distorted.

In addition, the sixth latent state may be inferred from an action inferred in order to determine a latent state at time t+1 determined in an environment in which the original image is slightly distorted from the latent state at time t determined in an environment in which the original image is slightly distorted and the latent state at time t determined in an environment in which the original image is significantly distorted.

That is, the sixth latent state corresponds to the next state of the first latent state, but may be inferred in consideration of not only an environment in which the original image is slightly distorted but also an environment in which the original image is significantly distorted.

Meanwhile, the representation learner 220 may further train the generator 221 to minimize at least one cost function with respect to the fifth latent state and the sixth latent state determined using the inverse dynamics module 223 and the forward dynamics module 224.

Specifically, the representation learner 220 may further train the inverse dynamics module 223 and the forward dynamics module 223 to equally output the fifth latent state and the sixth latent state inferred based on the first augmented image and the second augmented image.

For example, the representation learner 220 may train the inverse dynamics module 223 to minimize the difference between an actual action and an inferred action of the agent.

In addition, the representation learner 220 may train the forward dynamics model 224 to minimize the difference between an actual next latent state determined using the actual action of the agent and an inferred next latent state determined using the inferred action of the agent. More specifically, a cost function (or objective function) J(I) for the inverse dynamics module 223 can be represented as the following mathematical expression 3.

$$J(I) = \frac{\left(I(z_t^w, z_{t+1}^s - a_t)^2 + \left(I\left(z_{t,}^s, z_{t+1}^w\right) - a_t\right)^2\right.}{2} \quad \text{[Mathematical expression 3]}$$

Here, I represents the inverse dynamics module 223, $$z_t^w$$

represents the first latent state, $$z_{t+1}^s$$

represents the fourth latent state, $$I(z_t^w, z_{t+1}^s)$$

represents the first action, $$z_t^s$$

represents the second latent state, $$z_{t+1}^w$$

represents the third latent state, and $a_t$ represents the actual action of the agent.

Additionally, a cost function (or objective function) J(F) for the forward dynamics module 224 can be represented as the following mathematical expression 4.

$$J(F) = \frac{\Delta(\tilde{z}_{t+1}^s, z_{t+1}^s) + \Delta(\tilde{z}_{t+1}^w, z_{t+1}^w)}{2} \quad \text{[Mathematical expression 4]}$$

Here, F represents the forward dynamics module 224, $$\tilde{z}_{t+1}^s$$

represents the fifth latent state, $$z_{t+1}^s$$

represents the fourth latent state, $$\tilde{z}_{t+1}^w$$

represents the sixth latent state, $$z_{t+1}^w$$

represents the third latent state, and Δ represents cosine similarity.

In this manner, the representation learner 220 minimizes the cost function for the generator 221, the cost function for the discriminator 222, the cost function for the inverse dynamics module 223, and the cost function for the forward dynamics module 224 through backpropagation, and thus the effect of improving the performance of the generator 221 to output features with respect to at least one object related to a predetermined task in a specific environment can be achieved regardless of whether the original image is slightly distorted or significantly distorted.

Figure 3:
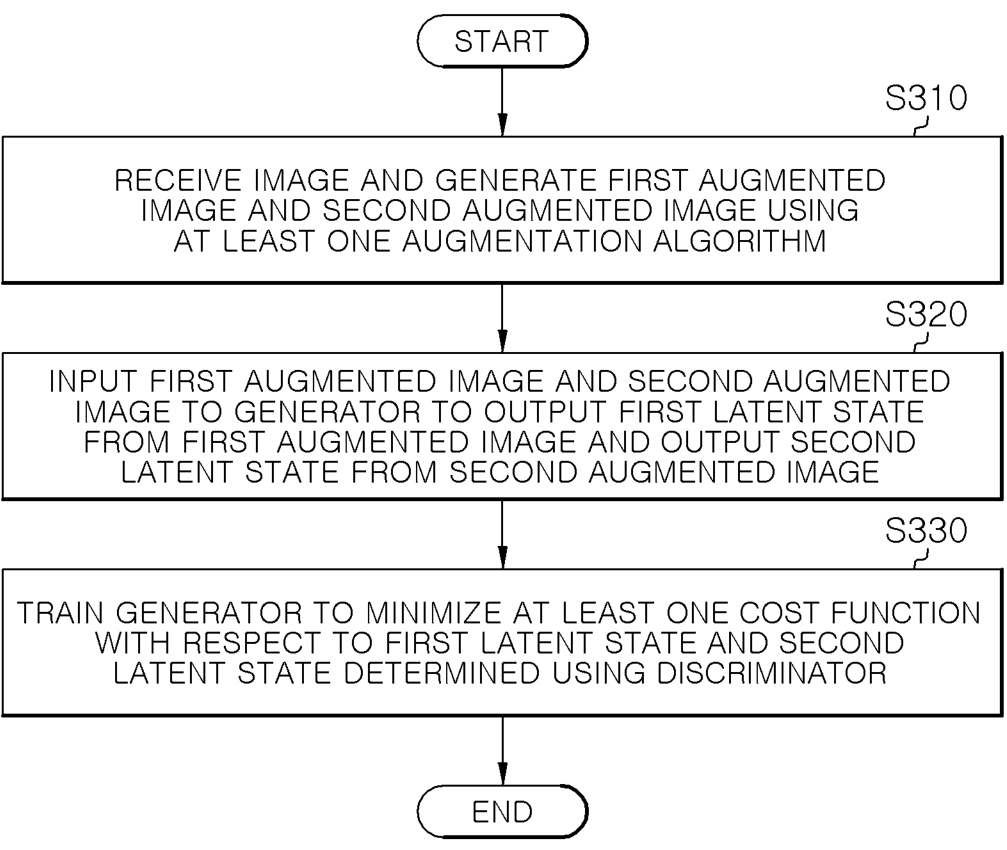
FIG. 3 is a flowchart showing a self-supervised representation learning method according to an embodiment of the present disclosure.

FIG. 3 is a flowchart showing a self-supervised representation learning method according to an embodiment of the present disclosure.

Referring to FIGS. 2 and 3, the image augmenter 210 may receive an image and generate a first augmented image and a second augmented image using at least one augmentation technique (S310). The representation learner 220 may input the first augmented image and the second augmented image to the generator 221, output a first latent state from the first augmented image, and output a second latent state from the second augmented image (S320). Additionally, the representation learner 220 may train the generator 221 to minimize at least one cost function with respect to the first and second latent states determined using the discriminator 222 (S330).

Figure 4:
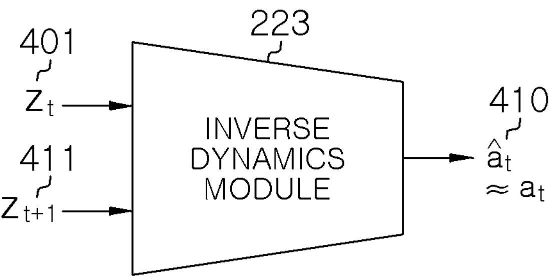
FIG. 4 is a block diagram illustrating a method of training an inverse dynamics module according to an embodiment of the present disclosure.

FIG. 4 is a block diagram illustrating a method of training an inverse dynamics module according to an embodiment of the present disclosure.

Referring to FIGS. 2 and 4, the representation learner 220 may receive a latent state for learning and the next state of the latent state for learning and trains the inverse dynamics module 223 to output an action of an agent according to the latent state for learning.

For example, the representation learner 220 may receive a latent state 401 at time t and a latent state 411 at time t+1 and train the inverse dynamics module 223 to infer an agent's action 410 for determining the latent state 411 at time t+1 from the latent state 401 at time t+1.

Figure 5:
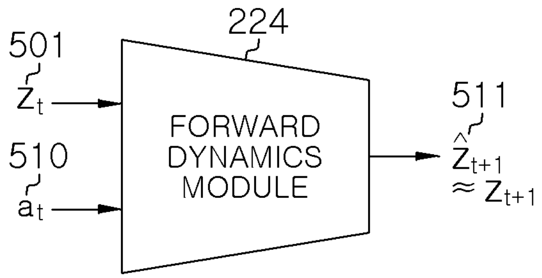
FIG. 5 is a block diagram illustrating a method of training a forward dynamics module according to an embodiment of the present disclosure.

FIG. 5 is a block diagram illustrating a method of training a forward dynamics module according to an embodiment of the present disclosure.

Referring to FIGS. 2 and 5, the representation learner 220 may receive a latent state for learning and an agent's action according to the latent state for learning and train the forward dynamics module 224 to output the next state of the latent state for learning.

Specifically, the representation learner 220 may receive a latent state 501 at time t and an agent's action 510 according to the latent state at time t and train the forward dynamics module 224 to infer a latent state 511 at time t+1.

Here, the agent's action 510 according to the latent state at time t may be inferred by the inverse dynamics module 223.

Figure 6:
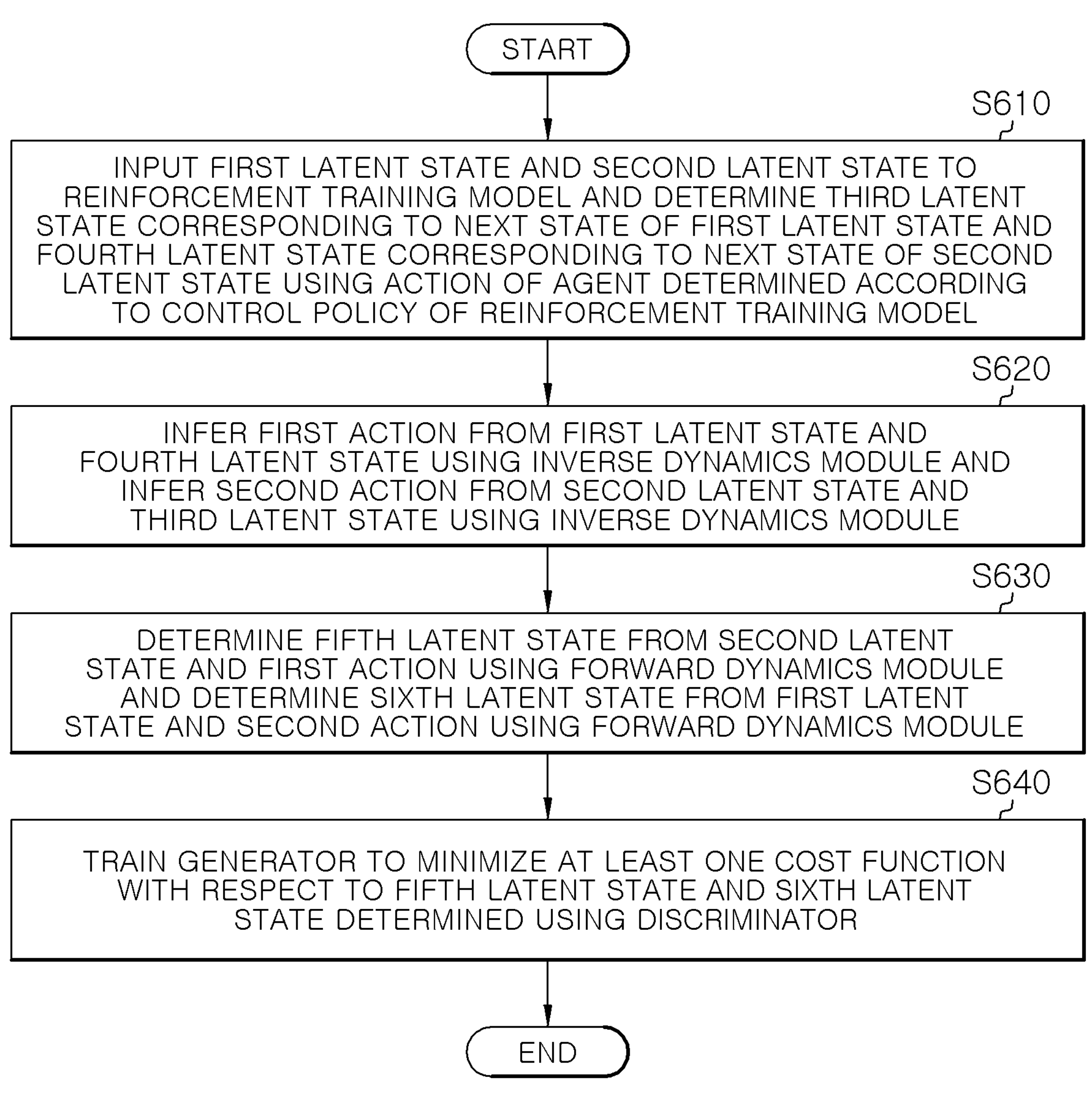
FIGS. 6, 7A, and 7B are a flowchart and block diagrams showing a self-supervised representation learning method using an inverse dynamics module and a forward dynamics module according to an embodiment of the present disclosure.
Figure 7A:
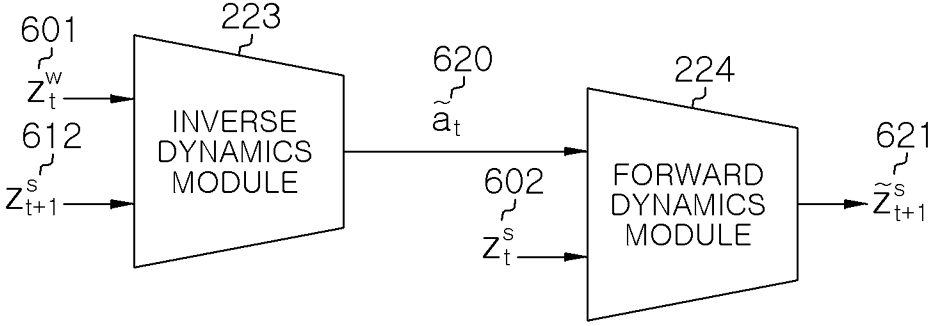
Figure 7B:
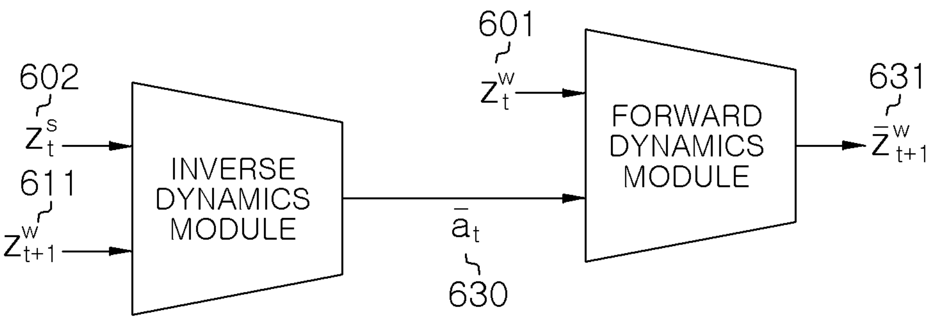

FIGS. 6, 7A, and 7B are a flowchart and block diagrams showing a self-supervised representation learning method using an inverse dynamics module and a forward dynamics module according to an embodiment of the present disclosure.

Referring to FIGS. 2, 6, 7A, and 7B, the representation learner 220 may input a first latent state 601 and a second latent state 602 to a reinforcement learning model and determine a third latent state 611 corresponding to the next state of the first latent state and a fourth latent state 612 corresponding to the next state of the second latent state using an agent's action determined according to the control policy of the reinforcement learning model (S610).

Next, the representation learner 220 may infer a first action 620 from the first latent state 601 and the fourth latent state 612 using the inverse dynamics module 223 and infer a second action 630 from the second latent state 602 and the third latent state 611 using the inverse dynamics module 223 (S620).

Next, the representation learner 220 may determine a fifth latent state 621 from the second latent state 602 and the first action 620 using the forward dynamics module 224 and determine a sixth latent state 631 from the first latent state 601 and the second action 630 using the forward dynamics module 224 (S630).

Next, the representation learner 220 may train the generator 221 to minimize at least one cost function with respect to the fifth latent state 621 and the sixth latent state 631 determined using the discriminator 222 (S640).

Figure 8:
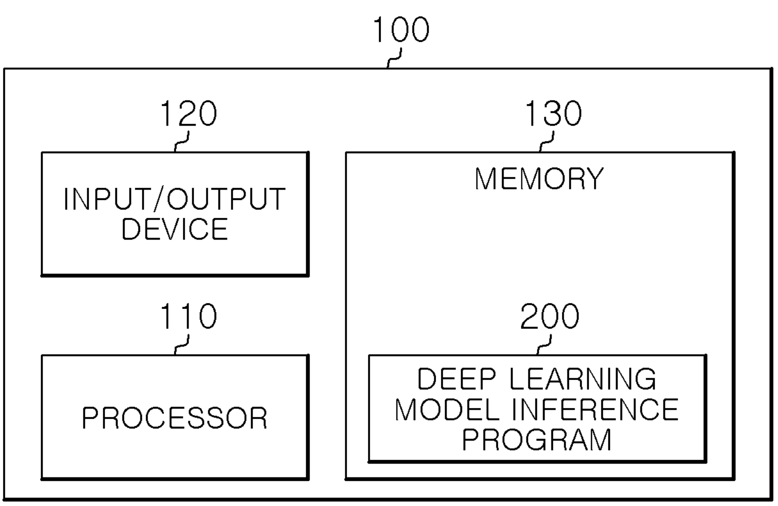
FIG. 8 is a block diagram showing a deep learning model inference device according to an embodiment of the present disclosure.

FIG. 8 is a block diagram showing a deep learning model inference device according to an embodiment of the present disclosure.

Referring to FIG. 8, the deep learning model inference device 800 may include a processor 810, an input/output device 820, and a memory 830.

The processor 810 may generally control the operation of the deep learning model inference device 800.

The processor 810 may receive input data using the input/output device 820.

Additionally, in the present disclosure, a deep learning model may refer to an artificial intelligence model that receives predetermined input data (e.g., image data, video data, etc.) and performs predetermined inference (e.g., data classification, image data classification, object detection, etc.).

Although it has been described that input data is input through the input/output device 820 in the present disclosure, the present disclosure is not limited thereto. For example, the deep learning model inference device 800 may include a transceiver (not shown), and the deep learning model inference device 800 may receive input data using the transceiver (not shown).

The input/output device 820 may include one or more input devices and/or one or more output devices. For example, input devices may include a microphone, a keyboard, a mouse, a touchscreen, etc., and output devices may include a display, a speaker, etc.

The memory 830 may store a deep learning model inference program 850 and information necessary to execute the deep learning model inference program 850.

In this specification, the deep learning model inference program 850 may refer to software that receives input data and includes instructions for performing inference using a deep learning model.

The processor 810 may load the deep learning model inference program 850 and information necessary to execute the deep learning model inference program 850 from the memory 830 in order to execute the deep learning model inference program 850.

The processor 810 may execute the deep learning model inference program 850 to input input data to a deep learning model and check results inferred through the deep learning model. Here, the deep learning model may be trained by the self-supervised representation learning device of FIGS. 1 and 2 described above. As another example, the deep learning model may be trained by the self-supervised representation learning method of FIGS. 3 to 6, 7A, and 7B.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A self-supervised representation training method for performing self-supervised representation training for vision-based reinforcement training robust to visual distractions using a self-supervised representation training program including a generator and a discriminator, the method comprising:

receiving an image to generate a first augmented image and a second augmented image using at least one predetermined augmentation algorithm;

inputting the first augmented image and the second augmented image to the generator to output a first latent state from the first augmented image and output a second latent state from the second augmented image; and training the generator and the discriminator to minimize at least one cost function with respect to the first latent state and the second latent state, the at least one cost function configured to perform optimization based on a difference between a first latent state value, determined by passing the first latent state through a classifier, and a second latent state value, determined by passing the second latent state through the classifier, wherein the at least one cost function comprises a first function and a second function, the first function configured to perform optimization such that the second latent state value is greater than the first latent state value, the second function configured to perform optimization such that the first latent state value is greater than the second latent state value.

2. The self-supervised representation training method of claim 1, wherein the augmentation algorithm includes a spatial augmentation algorithm and a pixel-level augmentation algorithm, and wherein the generating the first augmented image and the second augmented image comprises:

generating the first augmented image using the spatial augmentation algorithm; and generating the second augmented image using the spatial augmentation algorithm and the pixel-level augmentation algorithm.

3. The self-supervised representation training method of claim 1, wherein the training the generator and the discriminator comprises:

inputting the first latent state and the second latent state to a reinforcement training model; and determining a third latent state corresponding to a next state of the first latent state and a fourth latent state corresponding to a next state of the second latent state using an action of an agent determined according to a control policy of the reinforcement learning model, wherein the reinforcement learning model is trained to determine a control policy for maximizing cumulative reward.

4. The self-supervised representation training method of claim 3, wherein the self-supervised representation training program further includes an inverse dynamics module, wherein the self-supervised representation learning method further comprises:

inferring a first action from the first latent state and the fourth latent state using the inverse dynamics module; and inferring a second action from the second latent state and the third latent state using the inverse dynamics module.

5. The self-supervised representation training method of claim 4, wherein the inverse dynamics module is trained to receive a training latent state and a next state of the training latent state and output an action of the agent according to the training latent state.

6. The self-supervised representation learning method of claim 4, wherein the self-supervised representation training program further includes a forward dynamics module, wherein the self-supervised representation training method further comprises:

inferring a fifth latent state from the second latent state and the first action using the forward dynamics module; and inferring a sixth latent state from the first latent state and the second action using the forward dynamics module.

7. The self-supervised representation training method of claim 6, wherein the forward dynamics module is trained to receive a learning latent state and an action of the agent according to the learning latent state and output a next state of the learning latent state.

8. The self-supervised representation learning method of claim 6, further comprising training the generator and the discriminator to minimize at least one cost function determined using the inverse dynamics module and the forward dynamics module with respect to the fifth latent state and the sixth latent state.

9. A non-transitory computer readable storage medium storing computer executable instructions, wherein the instructions, when executed by a processor, cause the processor to perform a self-supervised representation training method for performing self-supervised representation training for vision-based reinforcement training robust to visual distractions using a self-supervised representation training program including a generator and a discriminator, the method comprising:

receiving an image to generate a first augmented image and a second augmented image using at least one augmentation algorithm;

inputting the first augmented image and the second augmented image to the generator to output a first latent state from the first augmented image and output a second latent state from the second augmented image; and training the generator and the discriminator to minimize at least one cost function with respect to the first latent state and the second latent state, the at least one cost function configured to perform optimization based on a difference between a first latent state value, determined by passing the first latent state through a classifier, and a second latent state value, determined by passing the second latent state through the classifier, wherein the at least one cost function comprises a first function and a second function, the first function configured to perform optimization such that the second latent state value is greater than the first latent state value, the second function configured to perform optimization such that the first latent state value is greater than the second latent state value.

10. The non-transitory computer readable storage medium of claim 9, wherein the augmentation algorithm includes a spatial augmentation algorithm and a pixel-level augmentation algorithm, and wherein the generating of the first augmented image and the second augmented image comprises generating the first augmented image using the spatial augmentation algorithm;

and generating the second augmented image using the spatial augmentation algorithm and the pixel-level augmentation algorithm.

11. The non-transitory computer readable storage medium of claim 9, wherein the training the generator and the discriminator comprises inputting the first latent state and the second latent state to a reinforcement training model; and determining a third latent state corresponding to a next state of the first latent state and a fourth latent state corresponding to a next state of the second latent state using an action of an agent determined according to a control policy of the reinforcement learning model, wherein the reinforcement learning model is trained to determine a control policy for maximizing cumulative reward.

12. The non-transitory computer readable storage medium of claim 11, wherein the self-supervised representation training program further includes an inverse dynamics module, wherein the self-supervised representation training method further comprises inferring a first action from the first latent state and the fourth latent state using the inverse dynamics module; and inferring a second action from the second latent state and the third latent state using the inverse dynamics module.

13. The non-transitory computer readable storage medium of claim 12, wherein the inverse dynamics module is trained to receive a training latent state and a next state of the training latent state and output an action of the agent according to the training latent state.

14. The non-transitory computer readable storage medium of claim 12, wherein the self-supervised representation training program further includes a forward dynamics module, wherein the self-supervised representation training method further comprises inferring a fifth latent state from the second latent state and the first action using the forward dynamics module; and inferring a sixth latent state from the first latent state and the second action using the forward dynamics module.

15. The non-transitory computer readable storage medium of claim 14, wherein the forward dynamics module is trained to receive a learning latent state and an action of the agent according to the learning latent state and output a next state of the learning latent state.

16. The non-transitory computer readable storage medium of claim 14, further comprising training the generator and the discriminator to minimize at least one cost function determined using the inverse dynamics module and the forward dynamics module with respect to the fifth latent state and the sixth latent state.

17. A device for inferring data using a self-supervised training model, the device comprising:

a memory configured to store one or more instructions; and a processor configured to execute the one or more instructions stored in the memory, wherein the instructions, when executed by the processor, cause the processor to check input data, input the input data to the self-supervised training model, and check results inferred by the self-supervised training model, wherein the self-supervised learning model is trained by a self-supervised representation training method comprising:

receiving a training image and generating a first augmented image and a second augmented image using at least one augmentation algorithm;

inputting the first augmented image and the second augmented image to a generator to output a first latent state from the first augmented image and output a second latent state from the second augmented image; and training the generator and the discriminator to minimize at least one cost function with respect to the first latent state and the second latent state, the at least one cost function configured to perform optimization based on a difference between a first latent state value, determined by passing the first latent state through a classifier, and a second latent state value, determined by passing the second latent state through the classifier, wherein the at least one cost function comprises a first function and a second function, the first function configured to perform optimization such that the second latent state value is greater than the first latent state value, the second function configured to perform optimization such that the first latent state value is greater than the second latent state value.

* * * * *